US010967907B2

(12) United States Patent
Kobayashi et al.

(10) Patent No.: US 10,967,907 B2
(45) Date of Patent: Apr. 6, 2021

(54) VEHICLE FRONT END STRUCTURE

(71) Applicant: Nissan North America, Inc., Franklin, TN (US)

(72) Inventors: Kaoru Kobayashi, Kanagawa (JP); Naoya Kodama, Kanagawa (JP); Masaya Innami, Kanagawa (JP); Tadahiro Kawano, Farmington Hills, MI (US); Jason Lyman, Whitmore Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 193 days.

(21) Appl. No.: 16/161,913

(22) Filed: Oct. 16, 2018

(65) Prior Publication Data

US 2020/0114971 A1    Apr. 16, 2020

(51) Int. Cl.
*B62D 21/11* (2006.01)
*B62D 21/15* (2006.01)
*B62D 25/08* (2006.01)

(52) U.S. Cl.
CPC ............ *B62D 21/155* (2013.01); *B62D 21/11* (2013.01); *B62D 25/082* (2013.01)

(58) Field of Classification Search
CPC .. B62D 21/152; B62D 21/155; B62D 25/082; B62D 21/02; B62D 21/03; B62D 21/06; B62D 21/11; B62D 25/088
USPC .......................................... 296/187.09, 187.1
See application file for complete search history.

(56) References Cited

U.S. PATENT DOCUMENTS

| | | | |
|---|---|---|---|
| 9,180,913 B2 | 11/2015 | Ameloot et al. | |
| 9,340,229 B2* | 5/2016 | Gabbianelli | B62D 21/11 |
| 2012/0248820 A1* | 10/2012 | Yasui | B60R 19/34 296/187.09 |
| 2013/0081897 A1* | 4/2013 | Dandekar | B62D 21/155 180/291 |
| 2015/0021935 A1* | 1/2015 | Baccouche | B60R 19/34 293/114 |
| 2015/0298742 A1 | 10/2015 | Ono et al. | |

(Continued)

OTHER PUBLICATIONS

International Search Report and Written Opinion in PCT/US2017/023028 dated May 23, 2019.

*Primary Examiner* — D Glenn Dayoan
*Assistant Examiner* — Sunsurraye Westbrook
(74) *Attorney, Agent, or Firm* — Global IP Counselors, LLP

(57) ABSTRACT

A vehicle front end structure includes an engine cradle and a force receiving structure. The engine cradle has a front corner and an engine mounted to the engine cradle. The force receiving structure has a force receiving surface extending laterally outboard from proximate the front corner of the engine cradle and a force directing section located rearward of the force receiving surface. The force receiving structure is installed to the engine cradle by a vertically oriented first mechanical fastener designed and structured such that during an impact event where an impacting force is applied to the force receiving surface, the force receiving structure pivots about the first mechanical fastener with an outboard portion of the force receiving surface initially moving rearward relative to the engine cradle and the force directing section initially moving laterally inboard contacting the engine and imparting a portion of the impacting force thereto.

20 Claims, 9 Drawing Sheets

(56) References Cited

U.S. PATENT DOCUMENTS

2016/0023681 A1 1/2016 Fujikawa et al.
2018/0022388 A1 1/2018 Nishikawa
2018/0118274 A1 5/2018 McConnell et al.

* cited by examiner

VEHICLE FRONT END STRUCTURE

BACKGROUND

Field of the Invention

The present invention generally relates to a vehicle front end structure of a vehicle. More specifically, the present invention relates to a vehicle front end structure that includes a force receiving structure configured to receive off-center impacting force and redirect at least a portion of forward velocity into a lateral velocity that moves the vehicle in a lateral direction.

Background Information

Vehicle body structures are regularly being redesigned to include structural features that absorb and/or redirect impact forces during impact events.

SUMMARY

One object of the disclosure is to provide a force receiving structure attached to an engine cradle that is configured to pivot in response to an impact event at a force receiving surface thereof.

In view of the state of the known technology, one aspect of the present disclosure is to provide a vehicle front end structure with an engine cradle and a force receiving structure. The engine cradle has a front corner and an engine mounted to the engine cradle. The force receiving structure has a force receiving surface extending laterally outboard from proximate a front corner of the engine cradle. A force directing section of the force receiving structure is located rearward of the force receiving surface. The force receiving structure is installed to the engine cradle by a vertically oriented first mechanical fastener designed and structured such that during an impact event where an impacting force is applied to the force receiving surface, the force receiving structure pivots about the first mechanical fastener with an outboard portion of the force receiving surface initially moving rearward relative to the engine cradle and the force directing section initially moving laterally inboard contacting the engine and imparting a portion of the impacting force thereto.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
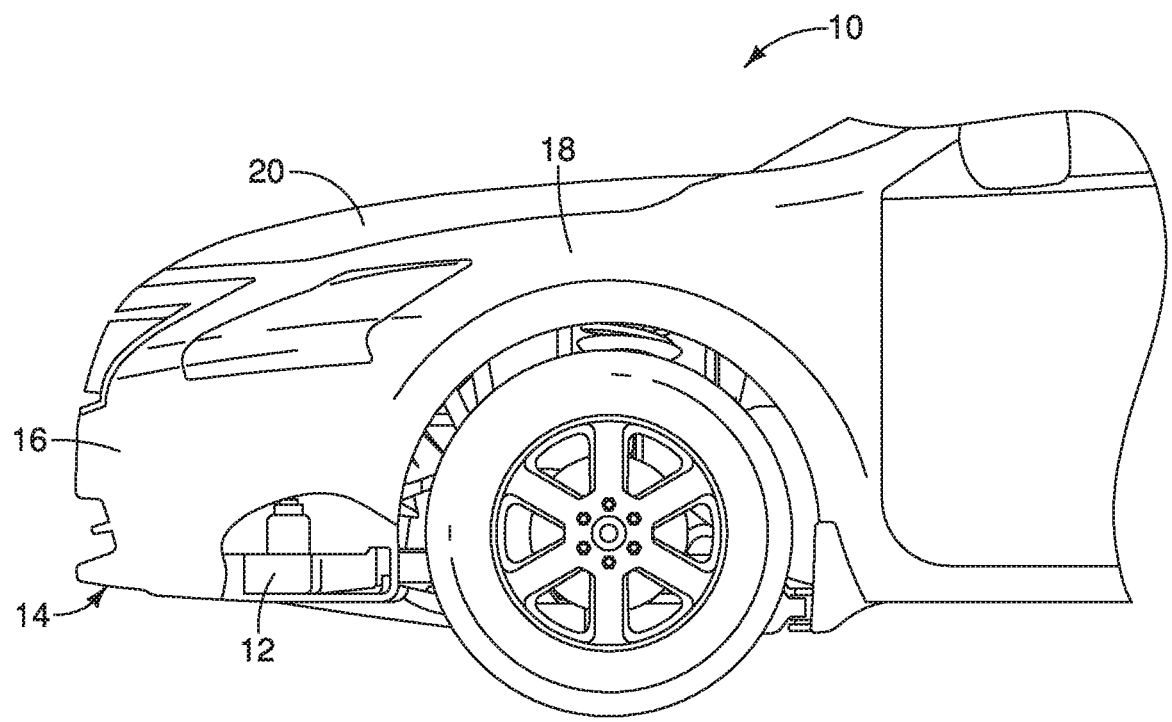
FIG. 1 is a side view of a vehicle that includes a force receiving structure in accordance with an exemplary embodiment.

Referring initially to FIG. 1, a vehicle 10 that includes a force receiving structure 12, is illustrated in accordance with a first embodiment. The force receiving structure 12 is also referred to as a force redirecting structure that redirects impact forces by using the impact force to re-direct forward motion of the vehicle 10 into lateral movement of the vehicle 10.

Figure 2:
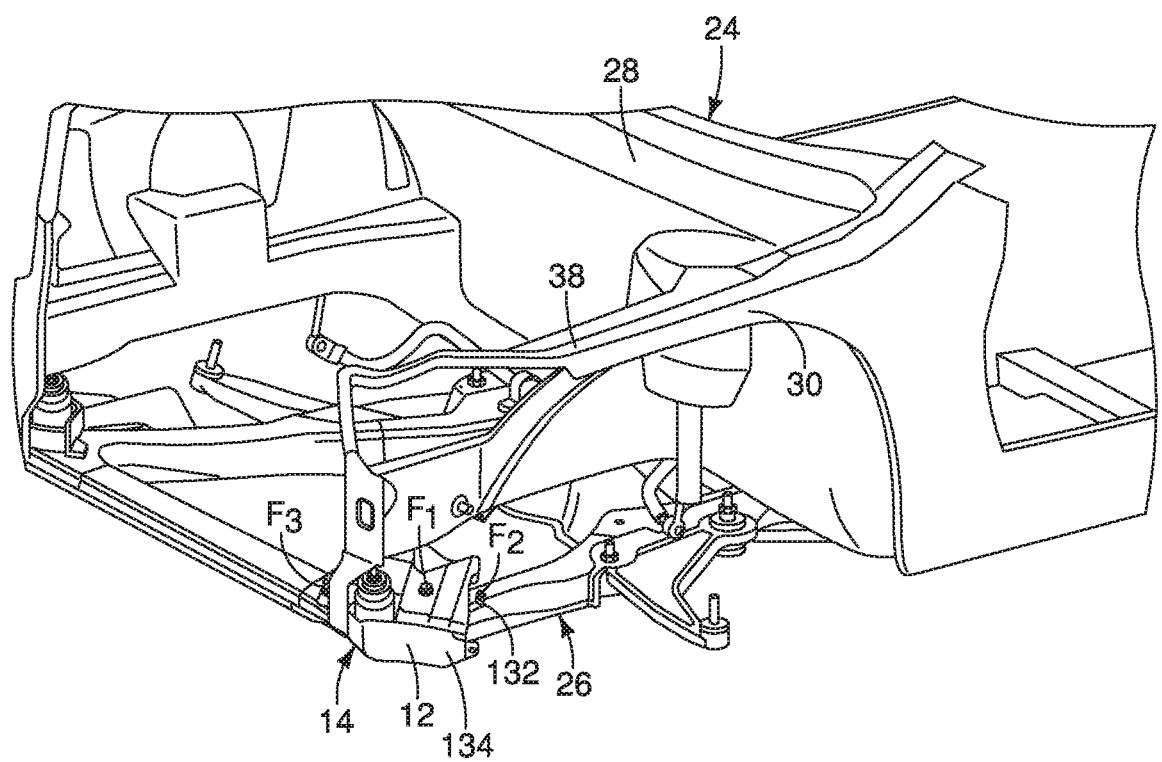
FIG. 2 is a perspective view of the vehicle with a hood, venters and bumper structure removed showing an engine cradle and the force receiving structure, in accordance with the exemplary embodiment.

As shown in FIG. 1, the vehicle 10 includes a front end structure 14 with a bumper assembly 16, a side fender 18 and an engine hood 20 that at least partially cover and conceal many of the structural elements that make up the front end structure 14. FIG. 2 is a view of the vehicle 10 with the bumper assembly 16, the side fender 18 and the engine hood 20 removed to reveal portions of the front end structure 14 and force receiving structure 12 of the vehicle 10.

As shown in FIG. 2, the front end structure 14 includes a variety of components, but in particular includes elements of a body structure 24 and an engine cradle 26.

Although only one side is shown in FIG. 2, each side of the body structure 24 includes at least the following: panels that make up a dash wall 28, a front side member 30 and a hood ledge 38. However, since the two sides (driver's side and passenger's side) of the body structure 24 are typically identical, but mirror images of one another, description of one side only is provided for the sake of brevity. In other words, the description of the one side of the body structure 24 applies equally to both sides of the body structure 24.

Figure 3:
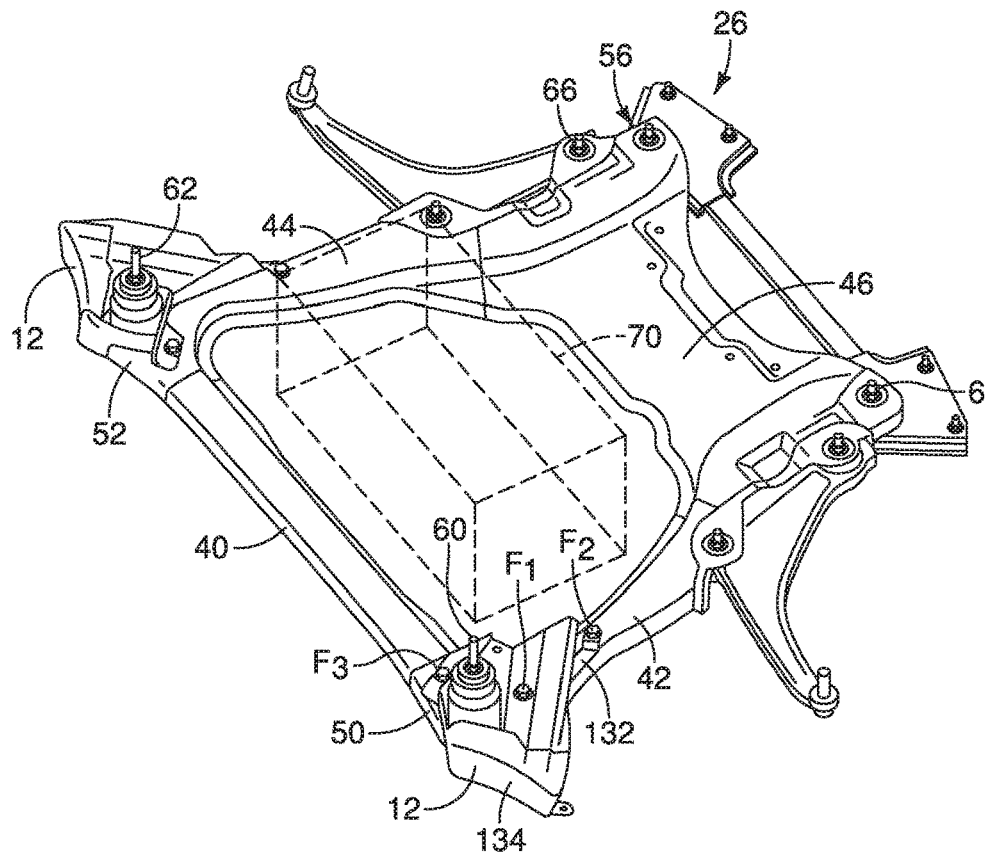
FIG. 3 is a perspective view of the engine cradle and the force receiving structure in accordance with the exemplary embodiment.
Figure 4:
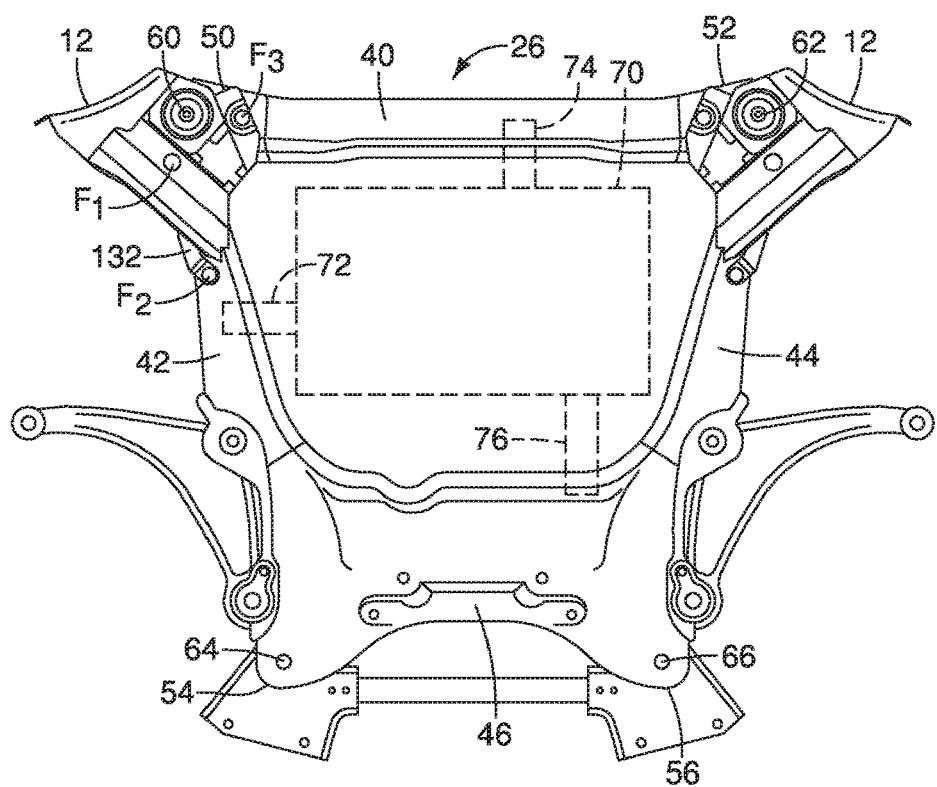
FIG. 4 is a top view of the engine cradle and the force receiving structure in accordance with the exemplary embodiment.

A description of the engine cradle 26 of the front end structure 14 is now provided with specific reference to FIG. 2-4. The engine cradle 26 includes a front engine cradle member 40, a driver's side engine cradle member 42, a passenger's side engine cradle member 44 and a rear engine cradle member 46. The front engine cradle member 40 and the driver's side engine cradle member 42 are fixedly attached to one another such that the intersection between them defines a first front corner 50. The front engine cradle member 40 and the passenger's side engine cradle member 44 are fixedly attached to one another such that the intersection between them defines a second front corner 52. The driver's side engine cradle member 42 and the rear engine cradle member 46 are fixedly attached to one another. Rearward of an intersection between the driver's side engine cradle member 42 and the rear engine cradle member 46, a first rear corner 54 of the engine cradle is defined. The passenger's side engine cradle member 44 and the rear engine cradle member 46 are fixedly attached to one another. Rearward of an intersection between the passenger's side engine cradle member 44 and the rear engine cradle member 46, a second rear corner 56 of the engine cradle 26 is defined.

The engine cradle 26 mounts to an underside of the body structure 24 at four body attachment structures 60, 62, 64 and 66. More specifically, the attachment structure 60 is located at the first front corner 50, the attachment structure 62 is located at the second front corner 52, the attachment structure 64 is located at the first rear corner 54 and the attachment structure 66 is located at the second rear corner 56. The attachment structures 60, 62, 64 and 66 are connected to an underside of the body structure 24 in a conventional manner. Specifically, the attachment structures 60 and 64 are attached to an underside of the front side member 30 on the driver's side of the vehicle 10, and the attachment structures 62 and 66 are similarly attached to an underside of the front side member on the passenger's side (not shown) of the vehicle 10.

Although the engine cradle attachments to the body structure 24 are structurally strong, the attachment structures 60, 62, 64 and 66 can include resilient bushings to absorb vibrations from an engine assembly 70 (described below) or alternatively can include rigid attachment structures, such as large fasteners such that the engine cradle 26 can be removably attached to the body structure 24.

The front attachment structures 60 and 62 include rigid cylindrically shaped portions that extend upward from respective first and second front corners 50 and 52 of the engine cradle 26. As described further below, the force receiving structures 12 (one on each side of the engine cradle 26) at least partially extend around the cylindrically shaped structures of the front attachment structures 60 and 62.

The engine cradle 26 also includes three engine mounting structures 72, 74 and 76. The engine mounting structure 72 is located along an upper surface of the driver's side engine cradle member 42, rearward from the first front corner 50.

The engine mounting structure 74 is located along an upper surface of the front engine cradle member 40. The engine mounting structure 76 is located along an upper surface of the rear engine cradle member 46.

Each of the engine mounting structures 72, 74 and 76 includes a motor mount (not shown) that directly attaches to the engine assembly 70.

The engine assembly 70 can include an engine, a transmission and a transaxle. The engine can be an internal combustion engine, an electric motor or a hybrid system (electric motor and an internal combustion engine). The transmission can be a continuously variable transmission (CVT), a dual clutch transmission (DCT), a manual transmission or an automatic transmission. The engine assembly 70 is depicted generically as a box in phantom for the sake of simplicity and brevity. However, it should be understood that each individual engine and transmission has its own unique size and shape. Therefore, the invention is not limited to the generic shape given to the engine assembly 70 in the drawings.

Figure 15:
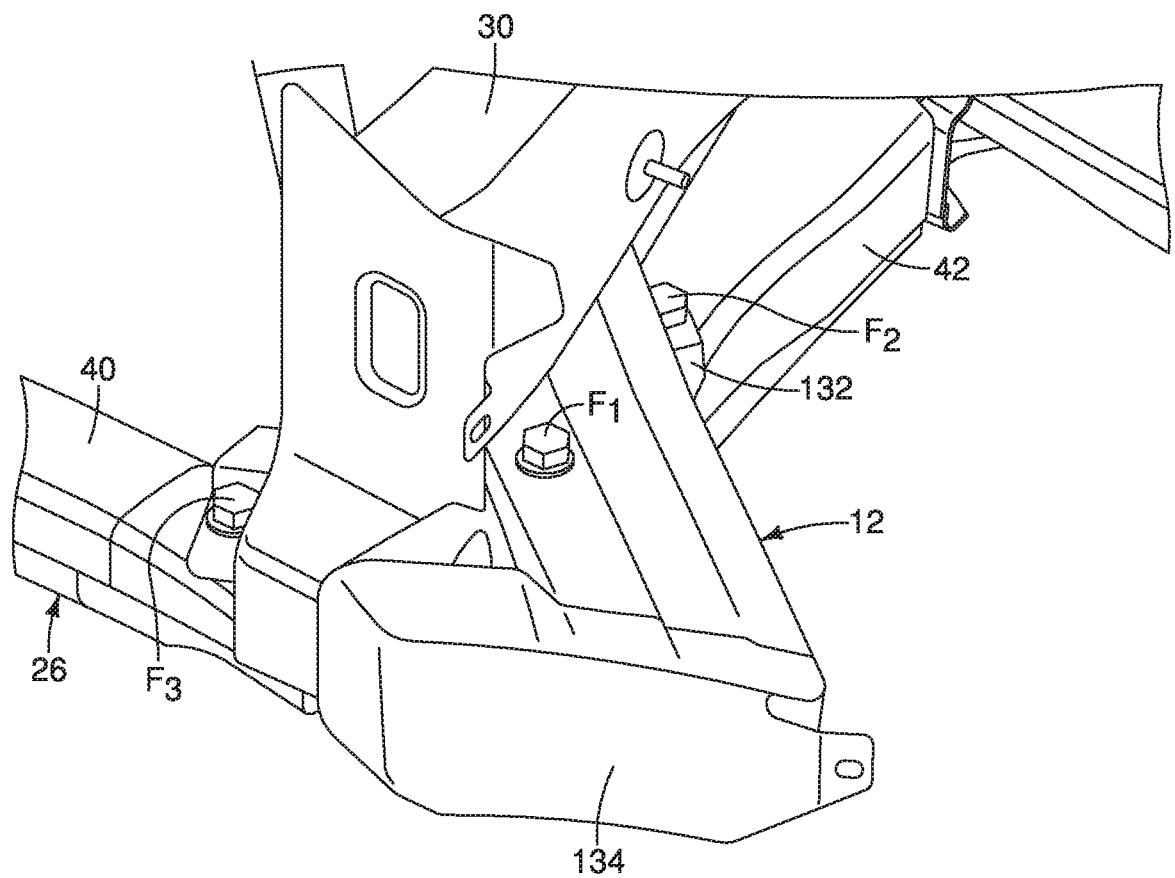
FIG. 15 is a perspective view of a front corner of the engine cradle showing the force receiving structure installed thereto by first, second and third fasteners in accordance with the exemplary embodiment.

The engine cradle 26 also can also support steering and suspension components, as indicated in FIG. 15. These steering and suspension components are basically supported by the rear engine cradle member 46 of the engine cradle 26. Description of these conventional steering and suspension components is omitted for the sake of brevity A description of the force receiving structure 12 is now provided with specific reference to FIGS. 5-11.

There are two force receiving structures 12, one installed at each of the first and second front corners 50 and 52 of the engine cradle 26. In the depicted embodiment and as shown in FIGS. 3 and 4, the force receiving structures 12 are identical, except that they are symmetrical mirror images of one another. Therefore, description of one of the force receiving structures 12 applies equally to the other of the force receiving structures 12. However, it should be understood from the drawings and the description herein that the force receiving structures 12 can alternatively be different. For example, if there is an engine or transmission component that requires additional space, a portion or portions of one of the force receiving structures 12 can be modified or reduced to accommodate such components that require addition engine compartment space.

Figure 5:
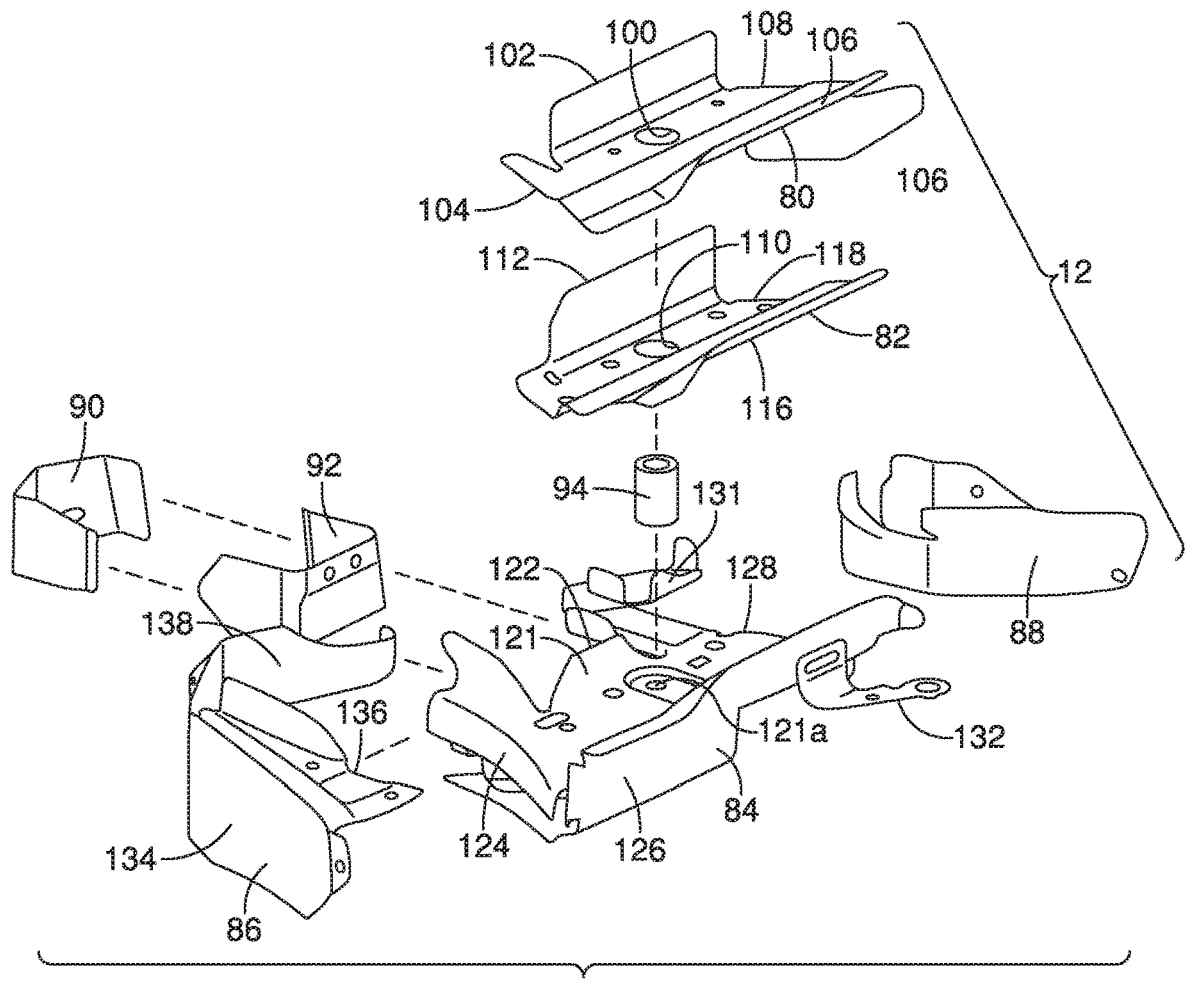
FIG. 5 is a perspective exploded view of the force receiving structure showing the various plates that are subsequently welded together to form the force receiving structure in accordance with the exemplary embodiment.

As shown in an exploded view in FIG. 5, the force receiving structure 12 includes a plurality of structure elements that, when welded to one another, define the structure depicted in FIGS. 6-11. Specifically, the force receiving structure 12 includes an upper plate 80, a middle plate 82, a lower plate 84, a main plate 86, an inboard plate 88, a first U-shaped plate 90, a second U-shaped plate 92 and a sleeve or collar 94.

The upper plate 80 includes an opening 100 that is centrally located relative to the assembled the force receiving structure 12, as described further below. The upper plate 80 further has a first edge 102, a second edge 104, a third edge 106 and a fourth edge 108.

The middle plate 82 includes an opening 110 that is centrally located relative to the assembled the force receiving structure 12, as described further below. The middle plate 82 further has a first edge 112, a second edge 114, a third edge 116 and a fourth edge 118.

Figure 7:
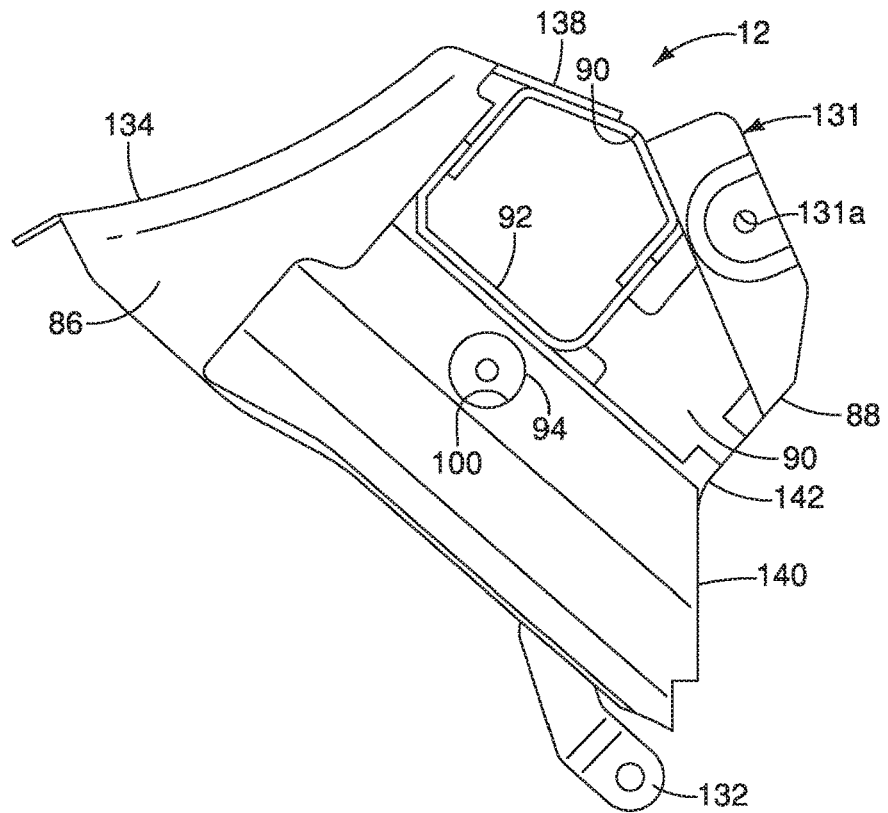
FIG. 7 is a top view of the force receiving structure shown removed from the vehicle in accordance with the exemplary embodiment.
Figure 8:
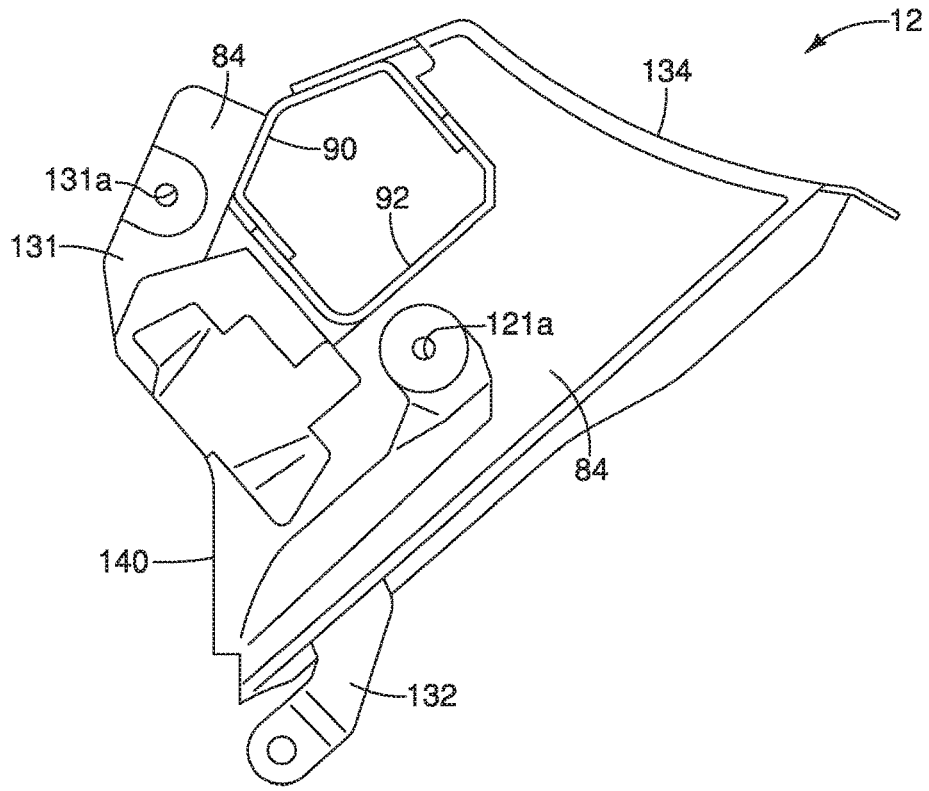
FIG. 8 is a bottom view of the force receiving structure shown removed from the vehicle in accordance with the exemplary embodiment.
Figure 9:
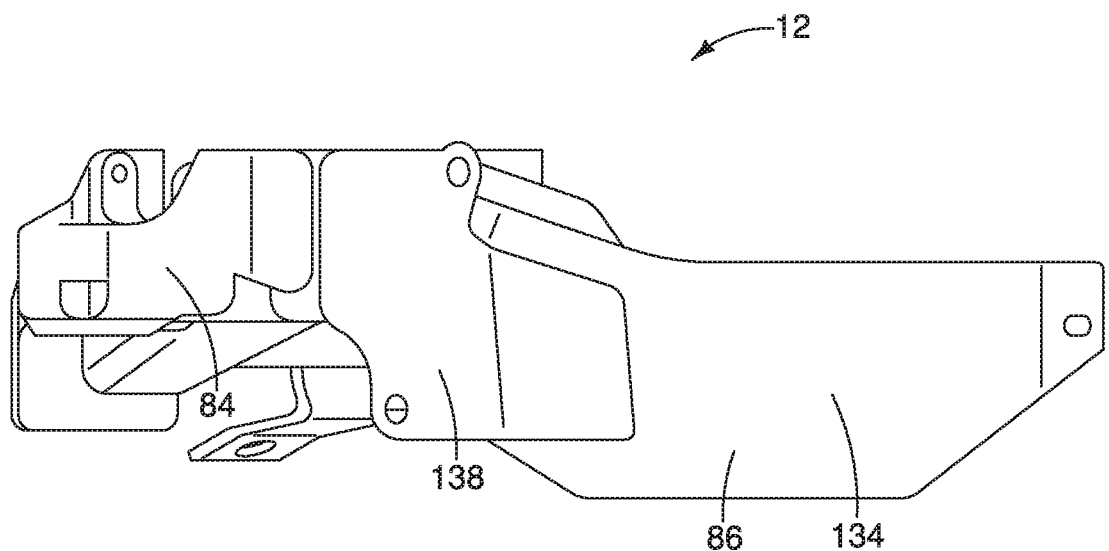
FIG. 9 is a front view of the force receiving structure shown removed from the vehicle in accordance with the exemplary embodiment.
Figure 10:
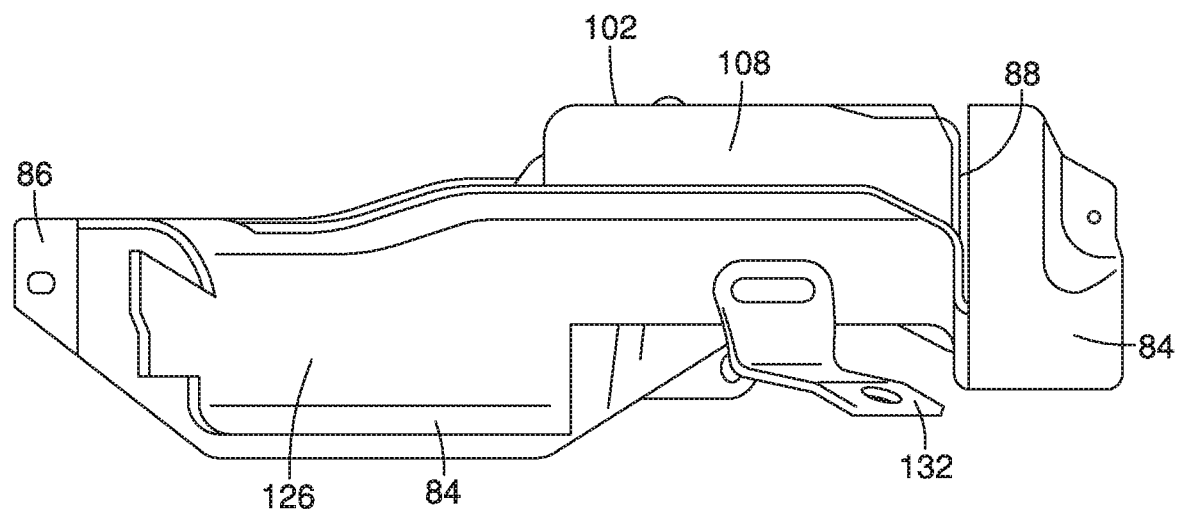
FIG. 10 is a rear view of the force receiving structure shown removed from the vehicle in accordance with the exemplary embodiment.

The lower plate 84 includes a main portion 121 with an opening 121a, an upwardly extending portion 122, a downwardly extending portion 124, an upwardly extending surface 126, a rearward edge 128, an upper edge 130, an attachment flange 131 with an opening 131a and a brakeaway attachment strip 132, as shown in FIG. 7.

The main plate 86 includes a force receiving surface 134, an upper horizontal flange 136 and a wrap-around flange 138.

The inboard plate 88 has a force directing section 140 and a support section 142.

The collar 94 is a rigid metal sleeve that has a thick-walled cylindrical shape. The collar 94 has an inner opening that has an inner diameter that is approximately half or slightly more than half the outer diameter of the collar 94. For example, the outer diameter of the collar 94 can be between 25 mm and 60 mm. The inner diameter can be between 13 mm and 35 mm. In an exemplary embodiment, the outer diameter of the collar 94 is, for example, 30 mm, and the inner diameter is approximately 17.5 mm. In the exemplary embodiment the annular wall of the collar 94 is approximately 6.25 mm thick. Further, a main fastener $F_1$ installed to the collar 94 can have a diameter of approximately 15.0 mm plus or minus 1 mm.

Figure 13:
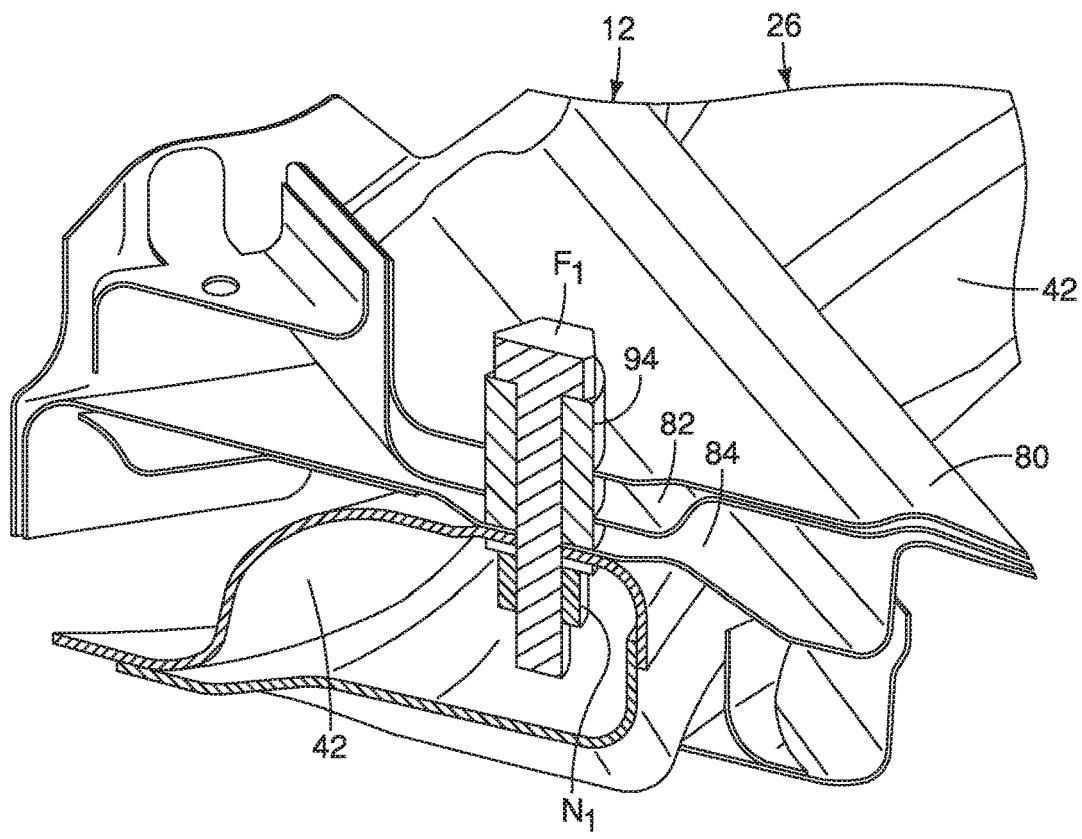
FIG. 13 is a cross sectional view of the force receiving structure and the engine cradle taken along the line 13-13 in FIG. 11 in accordance with the exemplary embodiment.

The force receiving structure 12 is welded together with at least the following welding relationships. Specifically, the collar 94 is welded to an upper surface of the lower plate 94 in axial alignment with the opening 121a. As shown in FIG. 13, the collar 94 extends through the opening 110 in the middle plate 82 and is welded to the middle plate 82 in an area surrounding the opening 110. The collar 94 further extends upward through the opening 100 in the upper plate 80 and is welded to the upper plate 80 in an area surrounding the opening 100. As is also shown in FIG. 13, the main fastener $F_1$ extends through the collar 94 and each of the upper, middle and lower plates 80, 82 and 84, and further through an opening in an upper portion of the driver's side engine cradle member 42. A hardened steel threaded nut $N_1$ is welded to the driver's side engine cradle member 42.

Figure 6:
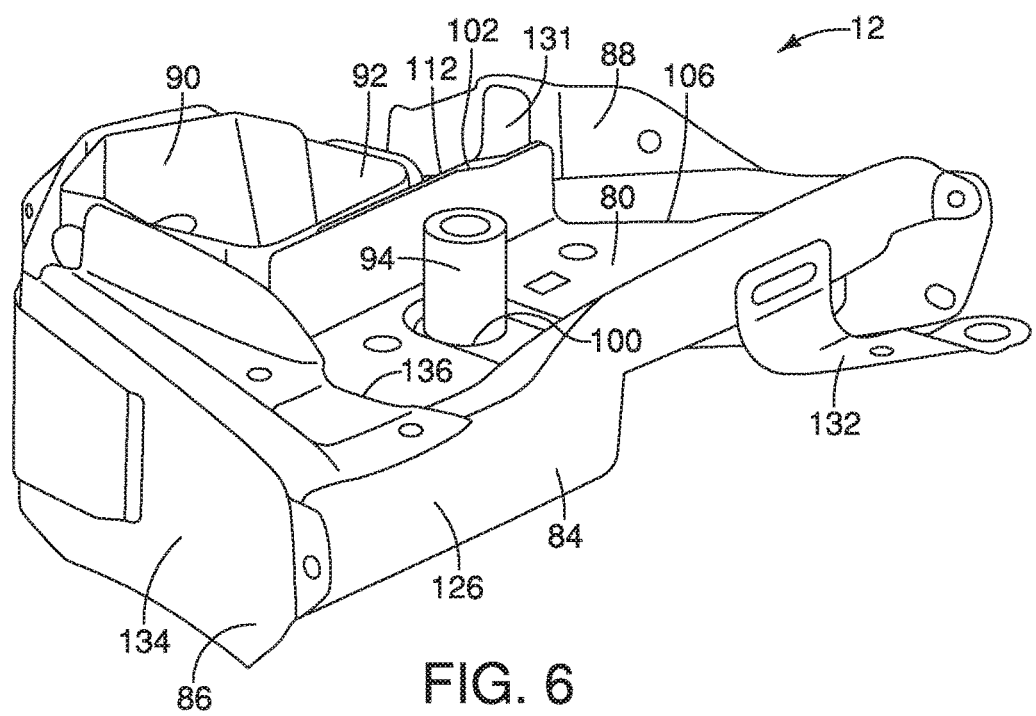
FIG. 6 is a perspective view of the force receiving structure shown removed from the vehicle in accordance with the exemplary embodiment.

The first edge 102 of the upper plate 80 is welded to the first edge 112 of the middle plate 82, as shown in FIG. 6. The first edge 112 of the middle plate 82 is welded to the upwardly extending portion 122 of the lower plate 84 (not shown). The inboard plate 88 is welded to at least the fourth edge 108 of the upper plate 80 and the rearward edge 128 of the lower plate 84 (not shown), and can optionally be welded to the fourth edge 118 of the middle plate 82. The main plate 86 is welded to the downwardly extending portion 124 of the lower plate 84, and the second edge 114 of the middle plate 82 and the second edge 102 of the upper plate 80 (not shown). The first U-shaped plate 90 and the second U-shaped plate 92 are welded to each other and to respective surfaces and or edges of the upper plate 80 and to the lower plate 84, as shown in FIGS. 7, 8 and 16-17. It should be understood from the drawings and the description herein, that a plurality of welds (not mentioned) are also preferred between the various plates to achieve the force receiving structure 12 shown in FIGS. 6-11. The first U-shaped plate 90 and the second U-shaped plate 92 define an opening that receives the attachment structure 60 when installed to the engine cradle 26, as shown in FIGS. 11, 12, 16 and 17.

Figure 11:
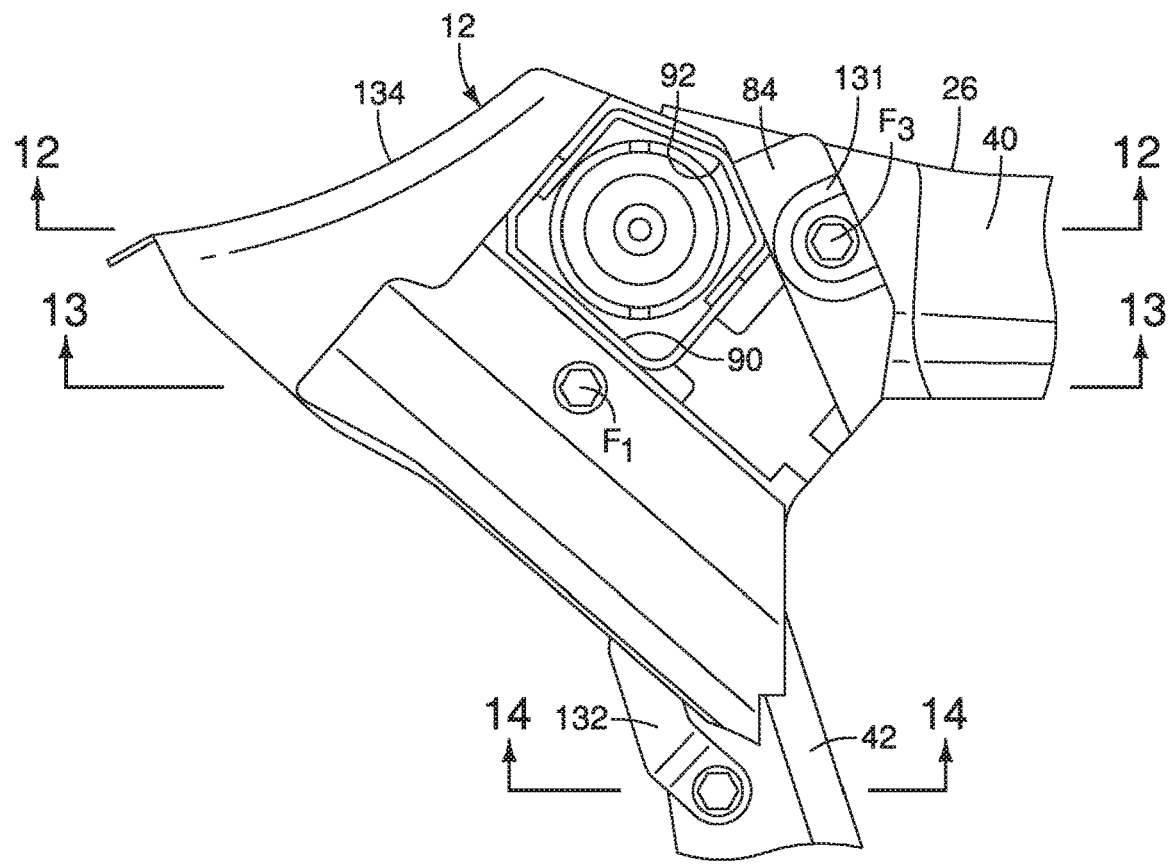
FIG. 11 is a top view of the force receiving structure installed to the engine cradle in accordance with the exemplary embodiment.
Figure 12:
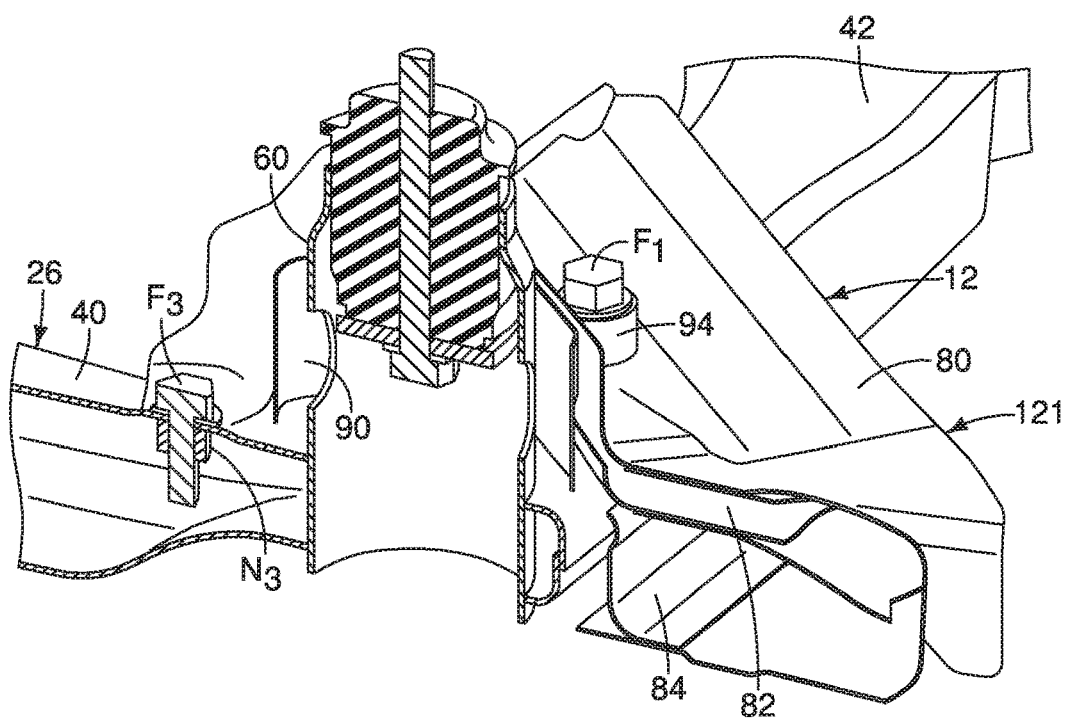
FIG. 12 is a cross sectional view of the force receiving structure and the engine cradle taken along the line 12-12 in FIG. 11 in accordance with the exemplary embodiment.
Figure 14:
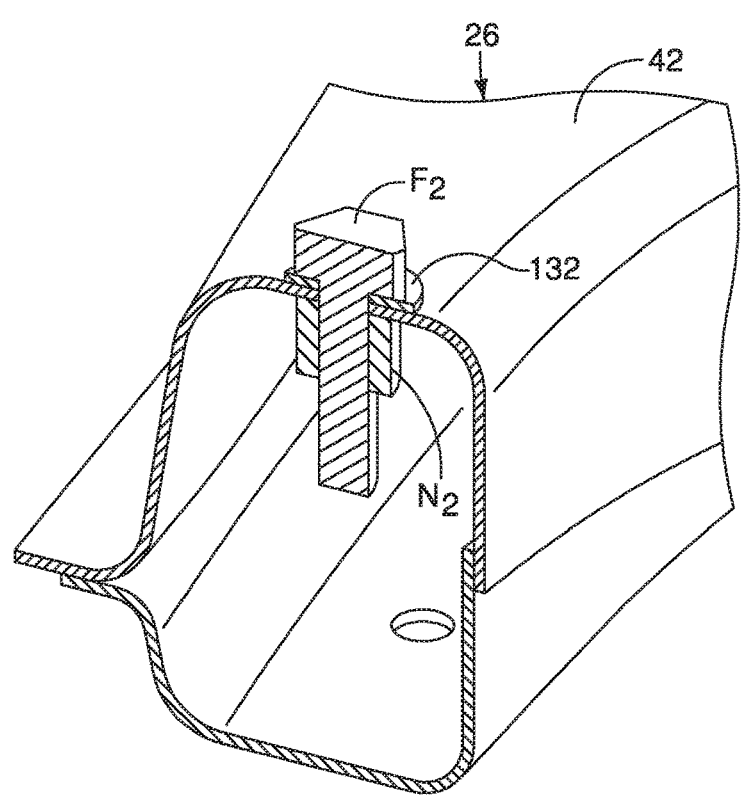
FIG. 14 is a cross sectional view of the force receiving structure and the engine cradle taken along the line 14-14 in FIG. 11 in accordance with the exemplary embodiment.

The force receiving structure 12 is attached to the engine cradle 26 via the main fastener $F_1$, a second fastener $F_2$ and a third fastener $F_3$. As described above and shown in FIGS. 11 and 13, the main fastener $F_1$ extends through the collar 94 extending completely through the force receiving structure 12, and, is installed to the nut $N_1$ welded to the driver's side engine cradle member 42. As shown in FIGS. 11, 12 and 14, the second fastener $F_2$ is inserted into the opening in the brake-away attachment strip 132 and into a nut $N_2$ welded to the driver's side engine cradle member 42 rearward from the first nut $N_1$. As shown in FIGS. 11 and 12, the third fastener $F_3$ is inserted into an opening in the front engine cradle member 40 and into a nut $N_3$ welded to front engine cradle member 40.

As is described further below, the fastener $F_1$ and the collar 94 have greater strength that the second fastener $F_2$, the brake-away attachment strip 132 and the third fastener $F_3$. Specifically, during an impact event, the second fastener $F_2$, the brake-away attachment strip 132 and the third fastener $F_3$ are all configured and dimensioned to shear or brake away such that the impact force acting on the force receiving structure 12 to pivot about the main fastener $F_1$ and the attachment structure 60 of the engine cradle 26, as shown in FIGS. 16 and 17.

Figure 16:
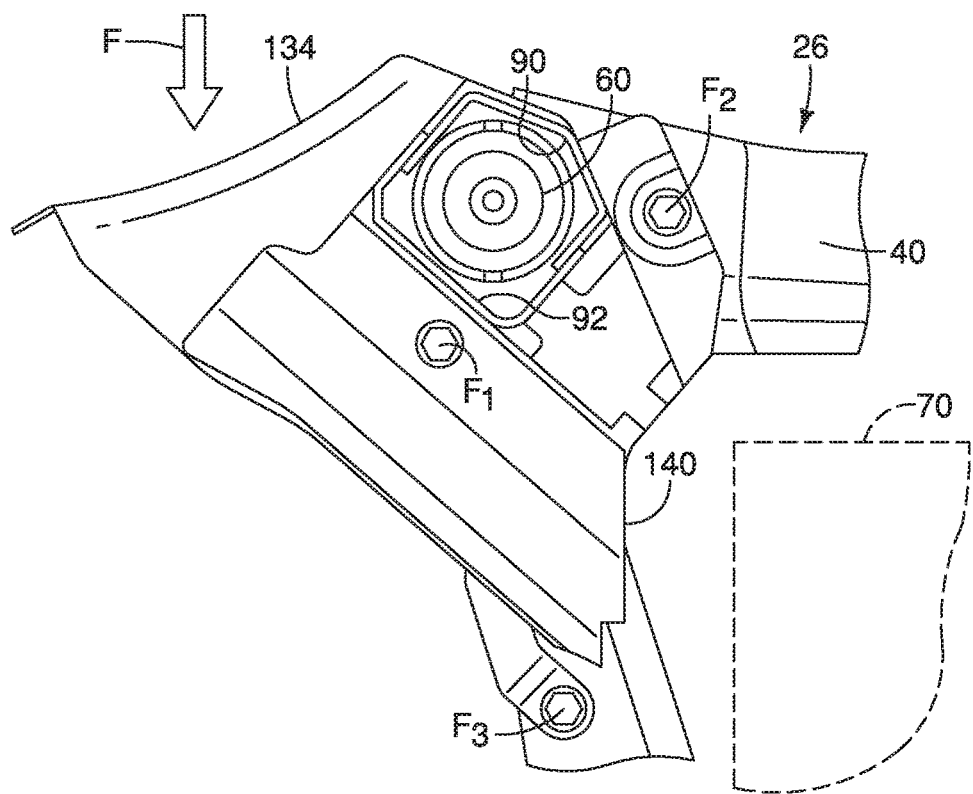
FIG. 16 is a top view of the front corner of the engine cradle showing the force receiving structure installed thereto by the first, second and third fasteners immediately before an impact event in accordance with the exemplary embodiment.
Figure 17:
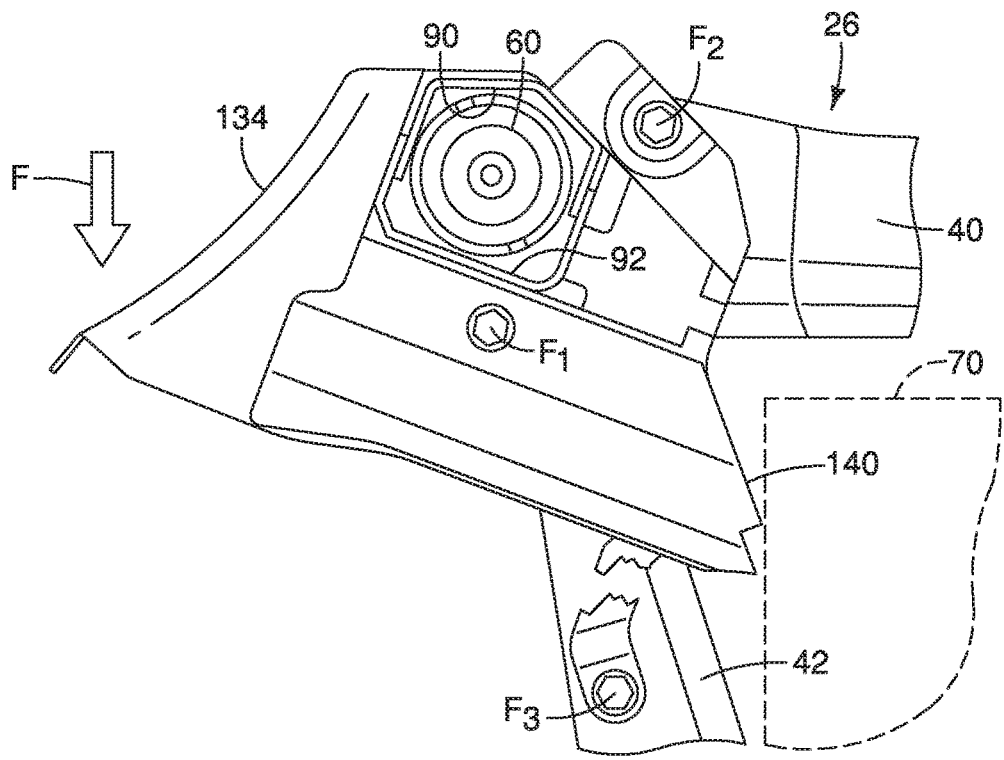
FIG. 17 is another top view of the front corner of the engine cradle and the force receiving structure during an impact event showing the force receiving structure after pivoting about the first fastener with the second and third fasteners sheared off during the impact event in accordance with the exemplary embodiment.

As is shown in the drawings, and in particular FIGS. 15-17, the force receiving structure has the force receiving surface 134 that extends laterally outboard from proximate the front corner 50 of the engine cradle 26. The force directing section 140 is located rearward of the force receiving surface 134. The force receiving structure 12 is installed to the engine cradle 26 by the vertically oriented first mechanical fastener $F_1$ (the main fastener) that is designed and structured such that during an impact event where an impacting force F is applied to the force receiving surface 134, the force receiving structure 12 pivots about the first mechanical fastener $F_1$ with an outboard portion of the force receiving surface 134 initially moving rearward relative to the engine cradle 26 and the force directing section 140 initially moving laterally inboard contacting the engine 70, as shown in FIG. 17, and imparting a portion of the impacting force thereto.

As shown in FIGS. 7, 8, 11, 16 and 17, the force receiving structure 12 has an overall U-shape with the attachment structure 60 extending upward though a gap defined between the force receiving surface 134 and the force directing section 140.

As shown in FIG. 16, the force receiving surface 134 of the force receiving structure 12 defines first side of U-shape and an inboard surface of the force directing section 140 defines a second side of the U-shape. The main fastener $F_1$ is located approximately mid-way between the force receiving surface 134 and the force directing section 140.

It should be noted that with the force receiving structure 12 fully assembled, the openings 100, 110 and 121a are co-axially aligned. Further, with the collar 94 welded in position to the force receiving structure 12, the central opening of the collar 94 is co-axially aligned with the openings 100, 110 and 121a. Further, the collar 94 extends upwardly above the upper surface of the force receiving structure 12. During the impact event, the collar 94 and the force receiving structure 12 are configured to pivot together about a vertical axis defined by the collar 94 and the main fastener $F_1$.

The various vehicle body elements and components (other than the force receiving structure 12) are conventional components that are well known in the art. Since such vehicle body elements and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle front end structure. Accordingly, these terms, as utilized to describe the present invention should be interpreted relative to a vehicle equipped with the vehicle front end structure.

The term "configured" as used herein to describe a component, section or part that includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle front end structure comprising:
   a vehicle body structure that includes a front side member;
   an engine cradle attached to an underside of the front side member such that the engine cradle is located below and is spaced apart from the front side member, the engine cradle having a front corner located below a front end of the front side member and an engine mounted to the engine cradle; and
   a force receiving structure located at the front corner below the front end of the front side member and having a force receiving surface extending laterally outboard from proximate the front corner of the engine cradle and a force directing section located rearward of the force receiving surface, the force receiving structure being installed to the engine cradle by a vertically oriented first mechanical fastener designed and structured such that during an impact event where an impacting force is applied to the force receiving surface, the force receiving structure pivots about the first mechanical fastener with an outboard portion of the force receiving surface initially moving rearward relative to the engine cradle and the force directing section initially moving laterally inboard contacting the engine and imparting a portion of the impacting force thereto.

2. The vehicle front end structure according to claim 1, wherein
   the engine cradle includes an attachment structure extending upward from the front corner and is configured to attach the engine cradle to the front side member of the vehicle body structure, the attachment structure of the engine cradle being located between the force receiving surface and the force directing section.

3. The vehicle front end structure according to claim 2, wherein
   the first mechanical fastener is located rearward of the attachment structure.

4. The vehicle front end structure according to claim 3, wherein
   the force receiving structure has an overall U-shape with the attachment structure extending upward though a gap defined between the force receiving surface and the force directing section.

5. The vehicle front end structure according to claim 4, wherein
   the first mechanical fastener is located adjacent to a rearward surface of the attachment structure such that during the impact event, the force receiving surface further pivots about the attachment structure.

6. The vehicle front end structure according to claim 1, wherein
   the force receiving structure has an overall U-shape with the attachment structure extending upward though a gap defined between the force receiving surface and the force directing section.

7. The vehicle front end structure according to claim 6, wherein
   the force receiving surface of the force receiving structure defines first side of U-shape and an inboard surface of the force directing section defines a second side of the U-shape.

8. The vehicle front end structure according to claim 6, wherein
   the first mechanical fastener is located approximately mid-way between the force receiving surface and the force directing section.

9. The vehicle front end structure according to claim 1, wherein
   the force receiving surface has an inboard corner and an outboard corner, the inboard corner being located at the front corner of the engine cradle and the outboard corner being located outboard and spaced apart from an outboard side of the engine cradle.

10. The vehicle front end structure according to claim 9, wherein
    the engine cradle includes a front member that extends laterally from the front corner of the engine cradle to an opposite front corner and a first lateral side member that extends rearward from the front corner of the engine cradle, and
    the force directing section has an inboard surface that has a forward corner and a rearward corner, the forward corner being located rearward of and adjacent to the front member of the cradle, the rearward corner of the inboard surface extending rearward therefrom along an inboard side of the first lateral side member.

11. The vehicle front end structure according to claim 10, wherein
the first mechanical fastener extends vertically through a portion of the force receiving structure at a location between a central area of the force receiving surface and a central area of the inboard surface of the force directing section.

12. A vehicle front end structure comprising:
an engine cradle having a front corner and an engine mounted to the engine cradle; and
a force receiving structure having a force receiving surface extending laterally outboard from proximate the front corner of the engine cradle and a force directing section located rearward of the force receiving surface, the force receiving structure being installed to the engine cradle by a vertically oriented first mechanical fastener designed and structured such that during an impact event where an impacting force is applied to the force receiving surface, the force receiving structure pivots about the first mechanical fastener with an outboard portion of the force receiving surface initially moving rearward relative to the engine cradle and the force directing section initially moving laterally inboard contacting the engine and imparting a portion of the impacting force thereto, the force receiving structure being further connected to the engine cradle via a second mechanical fastener and a third mechanical fastener that have a shear strength that is less than shear strength of the first mechanical fastener such that the second and third mechanical fasteners shear, deform or otherwise release the force receiving structure during the impact event.

13. The vehicle front end structure according to claim 12, wherein
the engine cradle includes a front member that extends laterally from the front corner of the engine cradle to an opposite front corner and a first lateral side member that extends rearward from the front corner of the engine cradle, and
the second mechanical fastener attaches the force receiving structure to the front member of the engine cradle proximate the front corner of the engine cradle, and the third mechanical fastener attaches the force receiving structure to the first lateral side member rearward of the first mechanical fastener.

14. A vehicle front end structure comprising:
an engine cradle having a front corner and an engine mounted to the engine cradle, the engine cradle including a front member, a first lateral side member, a second lateral side member and a rear member interconnected such that the front member and the first lateral side member define the front corner, the front member and the second lateral side member define a second front corner; and
a force receiving structure having a force receiving surface extending laterally outboard from proximate the front corner of the engine cradle and a force directing section located rearward of the force receiving surface, the force receiving structure being installed to the engine cradle by a vertically oriented first mechanical fastener designed and structured such that during an impact event where an impacting force is applied to the force receiving surface, the force receiving structure pivots about the first mechanical fastener with an outboard portion of the force receiving surface initially moving rearward relative to the engine cradle and the force directing section initially moving laterally inboard contacting the engine and imparting a portion of the impacting force thereto, with a second force receiving structure being installed to the second front corner.

15. The vehicle front end structure according to claim 1, wherein
the force receiving structure includes at least a lower plate, a middle plate and an upper plate welded to one another with central areas thereof being spaced apart from one another, the corresponding central areas having corresponding co-axially aligned openings extending therethrough, and
the force receiving structure includes a thick metal collar welded to at least the lower plate and the upper plate such that a central opening of the collar aligns with each of the co-axially aligned openings in the lower plate, the middle plate and the upper plate, and the first mechanical fastener extends through the central opening in the collar and is threadedly engaged with the engine cradle.

16. The vehicle front end structure according to claim 15, wherein
the collar is also welded to the middle plate.

17. The vehicle front end structure according to claim 15, wherein
the collar extends upward from the lower plate proximate to an upper surface of the engine cradle to a point above the upper surface of the upper plate of the force receiving structure.

18. The vehicle front end structure according to claim 15, wherein
the engine cradle includes a threaded nut welded to an upper wall of the engine cradle such that the first mechanical fastener extends through the collar and threads into the nut during installation of force receiving structure, thereby forcing the collar downward such that the lower plate of the force receiving structure is compressed against the upper surface of the engine cradle.

19. The vehicle front end structure according to claim 15, wherein
the collar and the force receiving structure are configured to pivot together about a vertical axis defined by the collar and the first mechanical fastener during the impact event.

20. The vehicle front end structure according to claim 15, wherein
the collar has an outer diameter such that an inner diameter of the central opening of the collar is a value of between 50 percent and 60 percent of the outer diameter of the collar.

* * * * *